United States Patent [19]

Wedege

[11] 4,265,648
[45] May 5, 1981

[54] CENTRIFUGE FOR SEPARATING GAS MIXTURES

[76] Inventor: Erling Wedege, Langbolgen 21, Oslo 11, Norway

[21] Appl. No.: 92,557

[22] Filed: Nov. 8, 1979

[30] Foreign Application Priority Data

Nov. 15, 1978 [NO] Norway .................. 783842

[51] Int. Cl.³ .......................................... B01D 45/14
[52] U.S. Cl. ...................................... 55/409; 55/417; 55/17; 55/DIG. 14
[58] Field of Search ................... 55/17, 401, 402, 403, 55/407, 408, 409, DIG. 14, 417, 400; 233/DIG. 1

[56] References Cited

U.S. PATENT DOCUMENTS

| | | | |
|---|---|---|---|
| 2,104,683 | 1/1938 | Rosen et al. | 55/403 |
| 3,234,716 | 2/1966 | Sevin et al. | 55/401 |
| 3,915,673 | 10/1975 | Tamai et al. | 55/17 |
| 3,998,610 | 12/1976 | Leith | 55/17 |

FOREIGN PATENT DOCUMENTS

| | | | |
|---|---|---|---|
| 664254 | 10/1929 | France | 55/409 |
| 787897 | 9/1935 | France | 55/408 |
| 805984 | 12/1936 | France | 55/408 |
| 436066 | 11/1923 | Fed. Rep. of Germany | 55/409 |
| 710366 | 6/1954 | United Kingdom . | |

*Primary Examiner*—David L. Lacey
*Attorney, Agent, or Firm*—Young & Thompson

[57] ABSTRACT

A centrifuge for separating gas mixtures, especially flue gases from oil- or coal-fired furnaces, which contain sulphur compounds ($SO_2$), comprising a rotor means including frustoconical plates spaced from one another in the direction of the rotor axis. The rotor means comprises two separate concentric sets of frustoconical plates, the inlet for the gas mixture being arranged in the annular space between the two concentric sets.

3 Claims, 3 Drawing Figures

CENTRIFUGE FOR SEPARATING GAS MIXTURES

The present invention relates to a centrifuge for separating gas mixtures, especially flue gases from oil- and coal-fired furnaces, which contain sulphur compounds ($SO_2$). According to the present invention, a centrifuge is provided which comprises a rotor means including frustoconical plates spaced from one another in the direction of the rotor axis, the centrifuge being characterized in that the rotor means comprises two separate concentric sets of frustoconical plates, the inlet for the gas mixture being arranged in the annular space between the two concentric sets.

The U.S. Pat. No. 3,234,716 to R. J. Sevin et al discloses a centrifuge, the rotor of which comprises a plurality of frustoconical plates spaced from one another, whereby the inlet for the fluid to be treated is connected with the separator channels between the frustoconical plates at a point intermediate of the inner and outer margins of the plates, thus seeming to provide two sets of frustoconical plates in the rotor. These presumed plate sets are however, integral and form a unit, whereas the present invention provides a centrifuge better suited for adaption to the actual needs in that the separate plate sets may be dimensioned (with mutual plate distance and angle of slope) and formed independently of each other, thus being better adaptable to handle the substances and quantities to be treated. The rotor means may for instance be readily adapted to the gas quantities which will flow inwardly and outwardly, respectively.

It is preferred according to the invention that the outlet for gases of low density be arranged in the region of the rotor axis, and its diameter is preferably equal to the inside diameter of the inner set of plates. It is also preferred that the outlets for the fractions separated in the centrifuge be provided with known per se throttling means for regulating the pressure conditions at the periphery of the centrifuge, in the inlet and the said space between the sets of plates, and in the outlet in the center of the centrifuge.

An important point to note is that with the present centrifuge, the exhaust pressures for the gases are completely individually adjusted as the fractions exit through one or more outlets.

The web elements spanning the said annular space and holding the two sets of frustoconical plates together may be arranged as helical webplates, thus having a positive direction influence on the gas flow in the said annular space.

When centrifuging gases in this centrifuge, one can separate denser (heavier) gases such as $SO_2$ so efficiently that the $SO_2$ gases will be completely free or only minimally mixed with other "lighter" components of the flue gases, but will of necessity be accompanied by any solid substances in the flue gas.

The invention will be described in greater detail in the following with reference to the accompanying schematical drawings, FIGS. 1–3, which illustrate the invention.

Figure 1:
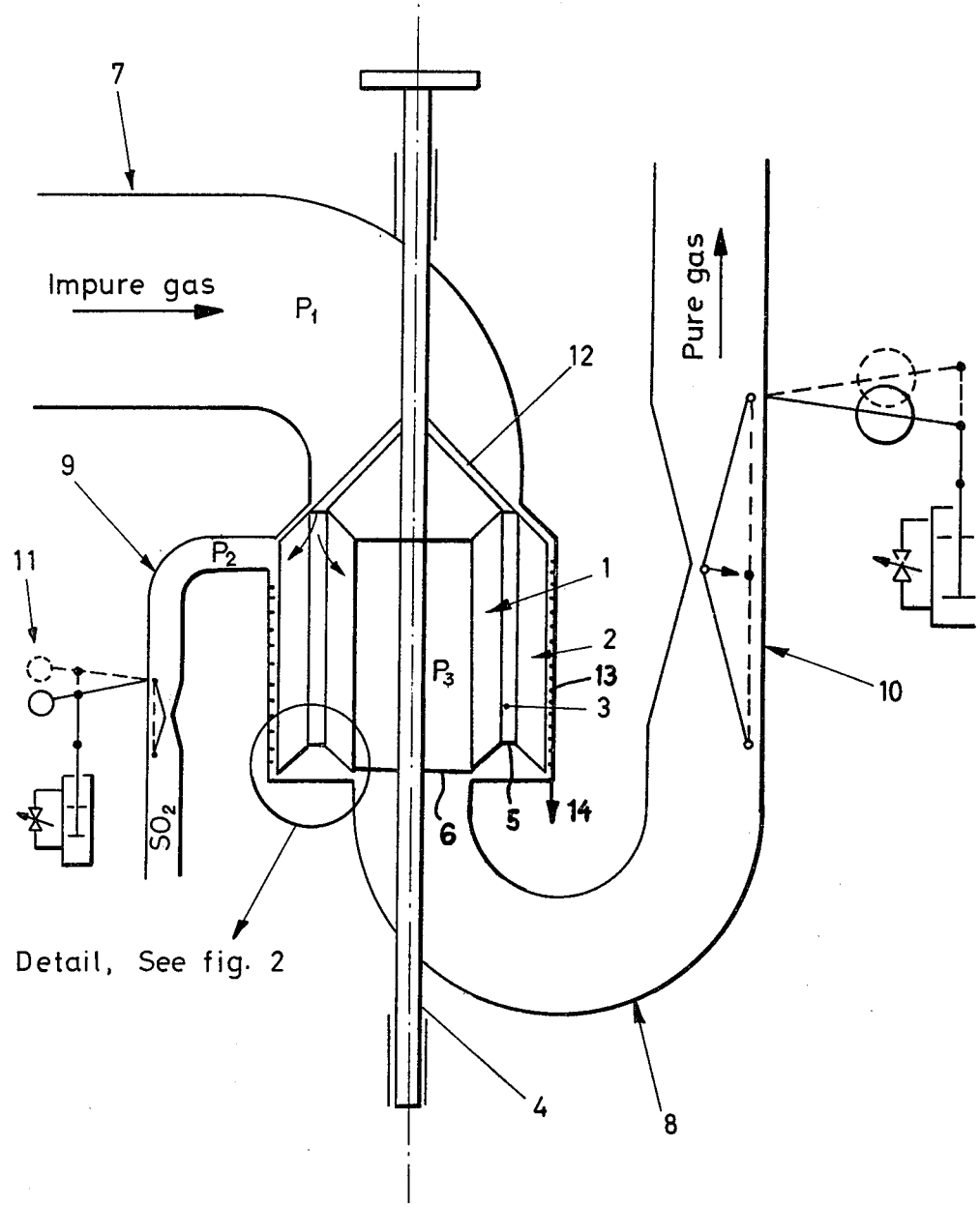
FIG. 1 is a longitudinal section through the centrifuge.
Figure 2:
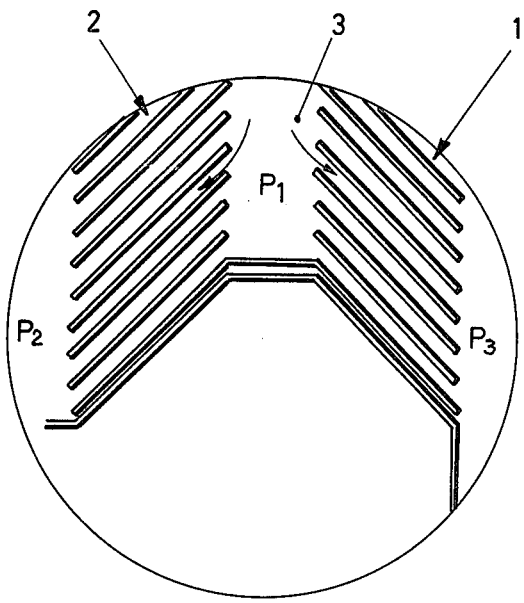
FIG. 2 is a detail drawing in partial section, of the encircled region in FIG. 1.
Figure 3:
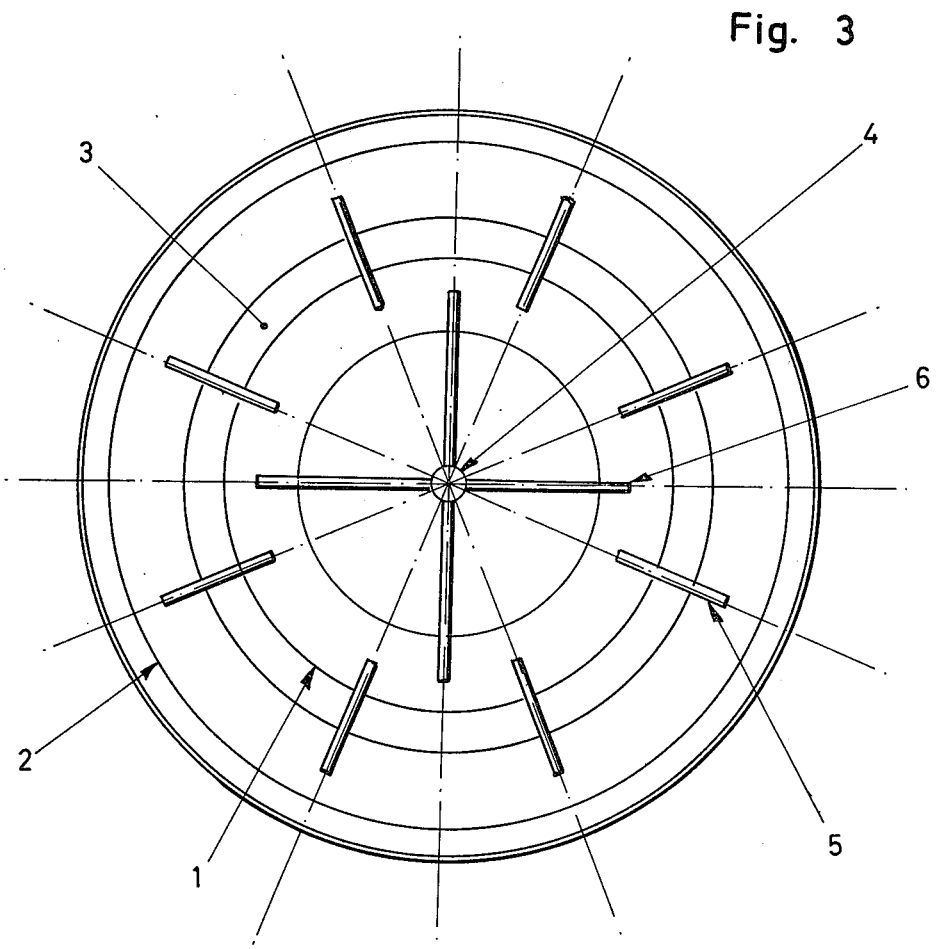
FIG. 3 is a schematic drawing of the centrifuge in cross section.

The centrifuge comprises an external, stationary housing with an inlet 7 which introduces the gas into the annular space 3 between two plate sets 1 and 2. Inside the inlet, optional fan blades 12 are indicated, attached to the rotating parts in the centrifuge. The centrifuge has two sets of plates, each composed of frustoconical plates spaced a suitable axial distance apart, arranged so as to form an inner set 1 and an outer set 2 of plates with annular space 3 between the two sets. The two sets of plates are attached to each other by connecting web elements 5 and the inner set of plates is attached to the shaft 4 by connecting plates 6. The web elements may be in the form of individual connecting elements and may preferably be in the form of helically wound web plates descending in the annular space between the two plate sets, thus imparting a motion to the gas flow in this area. The outlet duct 8 for gases of low density is provided in the center of the centrifuge. The diameter of this outlet can be as large as the inside diameter of the inner set of plates, and is dimensioned to accommodate the amount of gas which is to pass therethrough. Gases of high density ($SO_2$) are exhausted at the periphery of the centrifuge through the outlet pipe 9.

The centrifuge can be provided with easily movable and adjustable valves in both outlets. A valve 10 by being opened to a greater or lesser extent for the light gases, will affect the pressure $P_3$ in the center of the centrifuge, and a valve 11 by being opened more or less for the denser, heavy gases, will affect the pressure $P_2$ at the periphery of the centrifuge. This is necessary in order to control the pressure conditions and thereby to control the amounts of gases, especially when the $SO_2$ content of the gases varies. One must have the possibility of being able to regulate the gas pressures automatically and adjustably, independent of the centrifugal forces. As a result of a regulation which both quantitatively and qualitatively is good, the separated $SO_2$ gas will be mixed only to a minimal degree with lighter gases. This is of great importance if one wishes to reduce the separated $SO_2$ gas to sulphur. When the $SO_2$ gases are not mixed with other gases, or only minimally so, one can save almost half of the amount of $CO_2$ which would otherwise be required in the reduction process. In addition, one can ensure by means of regulated valves that all of the $SO_2$ gas will become separated, and that the lighter gases do not contain $SO_2$ and thus do not pollute the environment.

For purposes of illustration, one should note that the density at 1 atm. for the substances listed below is as follows:

$SO_2 = 2.9265$ kg/Nm
$CO_2 = 1.9768$
$O_2 = 1.4290$
air $= 1.2928$
$N_2 = 1.2505$
$H_2 = 0.0899$ The centrifuging operation with the present centrifuge is based on the following pressure conditions:

The pressure $P_1$ in the intermediate annular space 3 between plate sets 1 and 2 is greater than the sum of the pressure $P_3$ in the outlet duct 8 in the center of the centrifuge and the pressure which the gases of low density obtain owing to the centrifugal forces in the inner set of plates, but is less than the sum of the pressure $P_3$ and the pressure the gases of higher density attain, owing to the centrifugal forces in the inner set of plates 1.

Similar conditions apply for the outer set of plates. Thus, the pressure $P_2$ is greater than the sum of the pressure $P_1$ in the intermediate annular space between plate sets and the pressure the gases of low density attain owing to the centrifugal forces in the outer set of plates, but is less than the sum of the pressure $P_1$ and the pressure the gases of high density obtain owing to the centrifugal forces in the outer set of plates.

The centrifuge has a construction which permits it to handle large quantities of gas. The centrifuge's plate sets can have completely individual configurations, and can be dimensioned and adapted to handle the substances and quantities which are to be treated.

By removing the $SO_2$ content of the flue gases, one not only renders the gases harmless for the environment, but one can also utilize the heat content of the gases more efficiently. The $SO_2$ content in the flue gases causes the gases to reach the dew point already at about 300° C., and one can thus not cool the gases below this temperature without risking the formation of sulphuric acid and ensuing corrosion and acid attack. If one removes the $SO_2$ from the flue gas, one can use a less expensive oil (for example, heavy oil) with a higher sulphur content, and this means a very great saving.

With the present centrifuge, one can also optionally provide for the separation of solid particles which may accompany the gases. By means of helical grooves arranged in the interior of the stationary housing, such particles can be led to a separate outlet.

Having described my invention, I claim:

1. A centrifuge for separating gas mixtures, comprising a rotor means rotatable about an axis and including frustoconical plates spaced from one another in the direction of the rotor axis, said frustoconical plates comprising two separate radially spaced, concentric sets of frustoconical plates, the plates of one set being oppositely inclined from the plates of the other set, the inlet for the gas mixture being arranged in the annular space between the two concentric sets.

2. A centrifuge according to claim 1, in which the outlet for gases of lowest density is arranged in the region of the rotor axis and has a diameter about equal to the inside diameter of the inner set of plates.

3. A centrifuge according to claim 1, in which the outlets for both fractions of the gas mixture are provided with throttling means for regulating the pressure conditions in the periphery, in the inlet and in said annular space between the plate sets, and in the outlet in the center of the centrifuge.

* * * * *